US012263936B2

(12) United States Patent
Saber et al.

(10) Patent No.: US 12,263,936 B2
(45) Date of Patent: Apr. 1, 2025

(54) AIRCRAFT THRUSTER HAVING AN ANNULAR PART INTEGRAL WITH A FAIRING SURROUNDING A FIRST PROPELLER

(71) Applicant: SAFRAN, Paris (FR)

(72) Inventors: Christelle Saber, Moissy-Cramayel (FR); Sébastien Merle, Moissy-Cramayel (FR); Sabrina Ayat, Moissy-Cramayel (FR)

(73) Assignee: SAFRAN, Paris (FR)

( * ) Notice: Subject to any disclaimer, the term of this patent is extended or adjusted under 35 U.S.C. 154(b) by 593 days.

(21) Appl. No.: 17/603,286

(22) PCT Filed: Mar. 31, 2020

(86) PCT No.: PCT/EP2020/059129
§ 371 (c)(1),
(2) Date: Oct. 12, 2021

(87) PCT Pub. No.: WO2020/207862
PCT Pub. Date: Oct. 15, 2020

(65) Prior Publication Data
US 2022/0185452 A1 Jun. 16, 2022

(30) Foreign Application Priority Data
Apr. 12, 2019 (FR) ...................... 1903954

(51) Int. Cl.
*B64C 11/48* (2006.01)
*B64C 11/00* (2006.01)
(Continued)

(52) U.S. Cl.
CPC ............ *B64C 11/48* (2013.01); *B64C 11/001* (2013.01); *B64C 27/20* (2013.01); *B64D 27/24* (2013.01);
(Continued)

(58) Field of Classification Search
CPC ........ B64C 11/001; B64C 11/48; B64U 30/27
See application file for complete search history.

(56) References Cited

U.S. PATENT DOCUMENTS 11,414,198 B2 * 8/2022 Harvey .................... H02K 9/19
2009/0068033 A1 * 3/2009 Ishiba ..................... F02C 3/073
417/408
(Continued)

FOREIGN PATENT DOCUMENTS

EP 2 878 795 A1 6/2015
EP 3290334 A1 * 3/2018 ........... B64C 11/001
(Continued)

OTHER PUBLICATIONS

International Patent Application No. PCT/EP2020/059129, International Search Report and Written Opinion dated Jul. 15, 2020, 10 pgs.

*Primary Examiner* — Richard Green
*Assistant Examiner* — Arfan Y. Sinaki
(74) *Attorney, Agent, or Firm* — Cozen O'Connor

(57) ABSTRACT

An aircraft thruster includes at least a first propeller provided with a plurality of radial blades extending about an axis of rotation of the said first propeller, which is driven in rotation by a first electric motor. An electrical supply of the first electric motor includes power circuits carried by a fairing of the thruster characterized in that the power circuits are arranged in an annular manner in an annular part integral with the fairing of the thruster, this annular part being arranged around the said first propeller.

12 Claims, 4 Drawing Sheets

(51) Int. Cl.
   *B64C 27/20*   (2023.01)
   *B64D 27/24*   (2024.01)
   *B64U 30/26*   (2023.01)
   *B64U 50/19*   (2023.01)
   *H02K 7/14*    (2006.01)

(52) U.S. Cl.
   CPC ............ *B64U 30/26* (2023.01); *B64U 50/19* (2023.01); *H02K 7/14* (2013.01)

(56) References Cited

U.S. PATENT DOCUMENTS

2012/0235412  A1     9/2012  Dunne et al.
   2015/0308383  A1 *  10/2015  Hoffjann ............. H01M 8/1018
                                                             60/269
   2016/0152327  A1 *   6/2016  Bertels .................. B64U 30/26
                                                           415/121.3
   2020/0070990  A1 *   3/2020  Harvey .................. B64D 27/00
   2020/0106338  A1 *   4/2020  Ishida .................... H02K 16/02

FOREIGN PATENT DOCUMENTS

WO    WO 2005/072233 A2    8/2005
   WO    WO 2019/020684 A1    1/2019

* cited by examiner

AIRCRAFT THRUSTER HAVING AN ANNULAR PART INTEGRAL WITH A FAIRING SURROUNDING A FIRST PROPELLER

CROSS-REFERENCE TO RELATED APPLICATIONS

This application is a 35 U.S.C. § 371 filing of International Application No. PCT/EP2020/059129 filed Mar. 31, 2020, which claims the benefit of priority to French Patent Application No. FR1903954 filed Apr. 12, 2019, each of which is incorporated herein by reference in its entirety.

TECHNICAL FIELD OF THE INVENTION

The invention relates to the field of aeronautics and more particularly to the field of thrusters for an aircraft. More specifically, the invention relates to the field of electrically powered thrusters.

PRIOR ART

Aircraft with an engine for use during specific phases of flight are known. In particular, vertical take-off and landing aircraft, also known as VTOL, typically include a vertical take-off engine whose use is limited to this phase or to a hovering or semi-hovering phase of flight. FIG. 1 illustrates an aircraft 10 having a plurality of propellers without fairing 12 intended for forward flight and a plurality of propellers with fairing 14 intended for hover flight. These propellers 12, 14 can be driven by electric motors. One of the major challenges of using an electric motor to drive a propeller is its integration. The increasing electrification of aeronautical propulsion systems requires an increase in the power density of electrical and electromechanical converters. This criterion is essential to ensure the compactness of the entire electric drive chain.

FIG. 2 shows a diagram of an electro-mechanical chain 20 for driving a propeller 18 by an electric motor. A DC voltage source 22 $V_{dc}$ is connected across a capacitor 24. A power electronics converter 26, such as an inverter, with power switches 28 converts the input DC electrical energy into an output AC electrical energy. The outputs of the power converter 26 feed the stator windings of the polyphase electric motor. The electrical energy in the stator of the electric motor is converted into mechanical energy in the rotor, which is mechanically connected to the propeller 18.

Several integrations of the power electronics and the electric motor are possible. For example, the most common solution is to move the power electronics closer to the stator of the electric motor. Two separate blocks are kept and the power electronics are included on the surface of the electric motor housing. This solution has the advantage of a simple manufacturing process. However, the removal of the heat losses generated in the power electronics is problematic in view of the limited heat exchange surfaces and especially when high switching frequencies are envisaged. As the electronics can only operate at temperatures below those tolerated by electric motors, this overheating can lead to the failure of certain power components, in particular the power semiconductors.

In another solution, it was proposed to mount the power electronics at one axial end of the electric motor. However, this solution is still not satisfactory from the point of view of space requirements.

SUMMARY OF THE INVENTION

This document concerns an aircraft thruster comprising at least a first propeller provided with a plurality of radial blades extending around an axis of rotation of the said first propeller, which is driven in rotation by a first electric motor, the electrical supply means of which comprise power electronics circuits carried by a fairing of the thruster, characterised in that the circuits of the power electronics are arranged in an annular manner in an annular part integral with the fairing of the thruster, this annular part being arranged around said first propeller.

The proposed arrangement allows for greater compactness since the power electronics circuits are integrated in an annular part integral with the thruster fairing that surrounds the propeller. Furthermore, the cooling of said power components is improved since the heat exchange surface is increased compared to the previous technique. The power circuits are able to perform a power conversion between a DC voltage and an AC voltage.

In one feature, the electric motor comprises a rotor ring part surrounding and integral with the radially outer ends of the blades.

Also, the annular part integral with the fairing can surround an annular stator part of the electric motor. This annular part integral with the fairing and the annular stator part of the electric motor can together delimit an annular space, one end of which opens out along the axis of the first propeller and towards the upstream side of the first propeller with respect to the air flow. The formation of an annular space allows cooling air to circulate on a radially inner face of the annular part integral with the fairing, which makes it possible to better cool the circuits of the power electronics housed in the annular part integral with the fairing. In addition, the air entering the annular space can cool the stator ring part of the electric motor.

In another embodiment, the electric motor can comprise a rotor ring part that is integral with the radially inner ends of the blades. This annular rotor part can surround a possibly annular stator part of the electric motor carrying windings, this stator part of the electric motor being connected to the annular part integral with the aircraft fairing.

The first propeller or any other propeller of the thruster can be guided in rotation in a central hub integral with the annular part integral with the fairing. The fixed connection between the two aforementioned parts can be made by radial connecting arms, for example regularly distributed around the axis of rotation of the propeller(s).

Also, the at least one first propeller can lack a central hub connected to the radially inner ends of the blades.

The power supply means can comprise a voltage source connected in parallel to a capacitor formed annularly within the annular part of the fairing.

The thruster can comprise a second propeller counter-rotating the first propeller, this second propeller being arranged downstream of said first propeller and being rotated by a second electric motor. The use of two electric motors allows each propeller to be independent of the other and allows different rotation speeds.

When a fixed central hub is provided, the rigid connection between the fixed hub supporting the stator ring part of the electric motor and the stator ring part integral with the fairing is made by radial arms as indicated above to allow air flow from the first upstream propeller to the second downstream counter-rotating propeller.

DETAILED DESCRIPTION OF THE INVENTION

Figure 1:
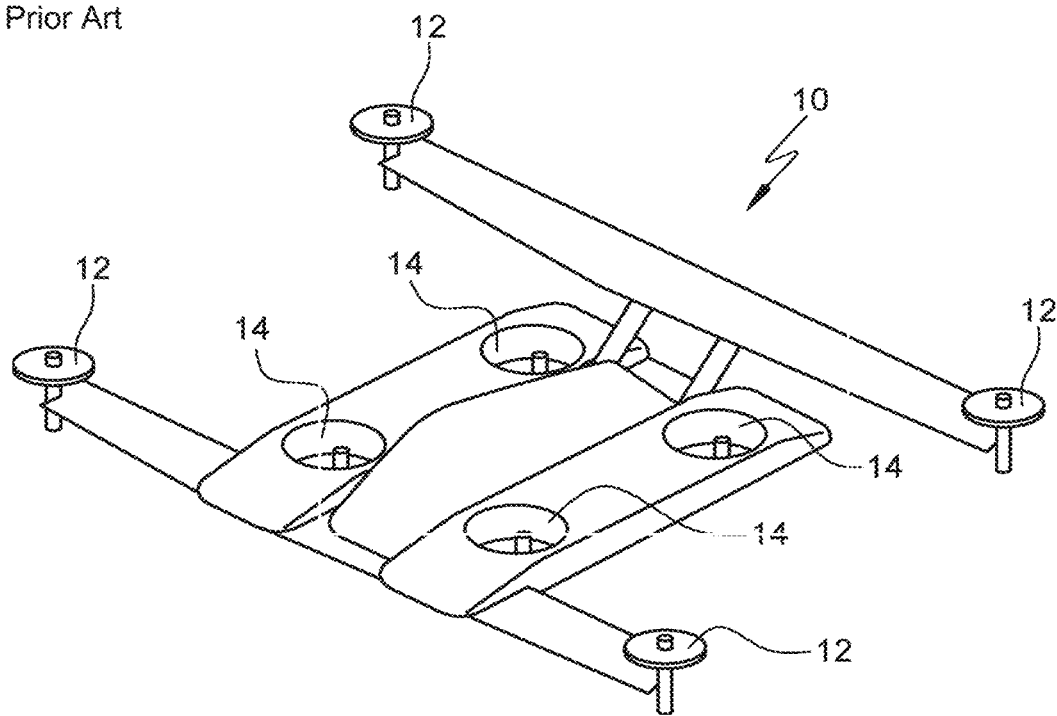
FIG. 1 represents an embodiment of prior art aircraft.
Figure 2:
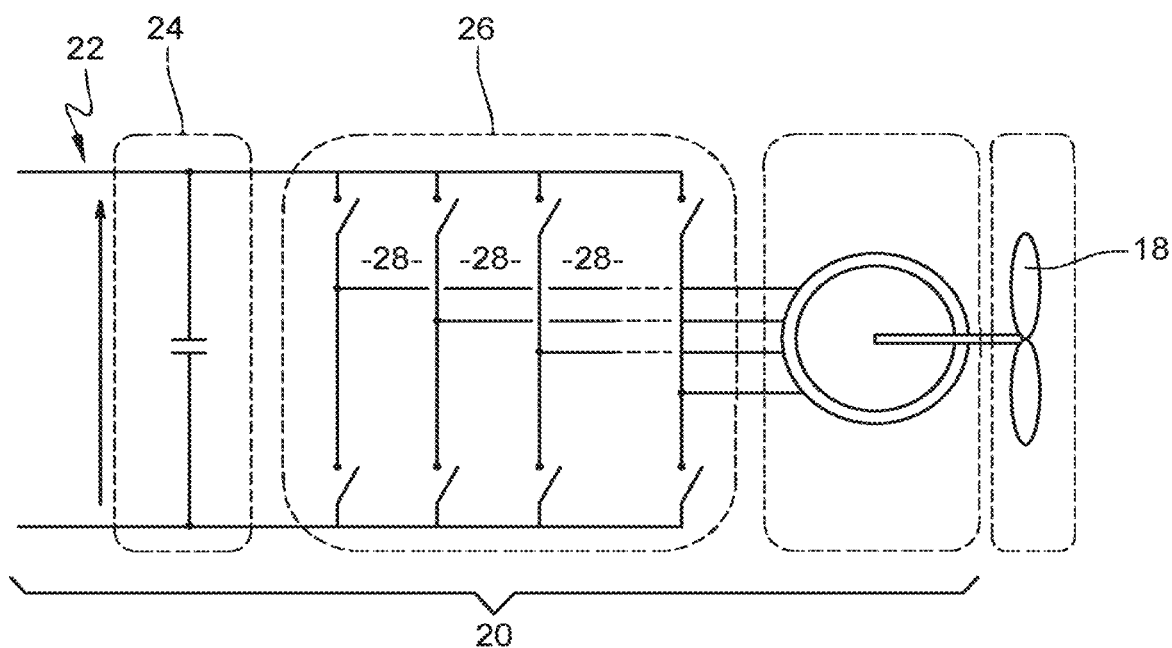
FIG. 2 represents an electro-mechanical diagram of a propeller drive.
Figure 3:
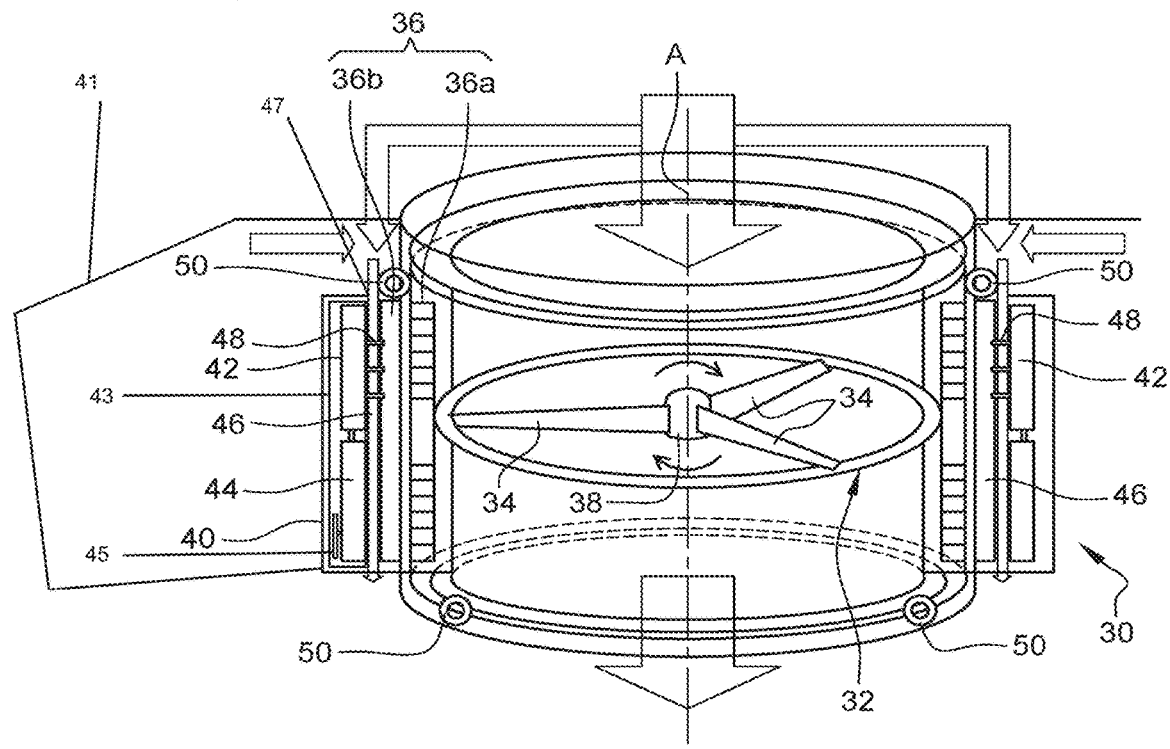
FIG. 3 represents an aircraft thruster including a propeller, in embodiments.

Reference is now made to FIG. 3, which represents a first embodiment of the invention representing an aircraft thruster 30 comprising a propeller 32 provided with a plurality of blades 34 extending radially with respect to an axis A of rotation of the thruster 30. The propeller 32 is rotated by an electric motor 36 having a rotor ring part 36a and a stator ring part 36b. The radially inner ends of the blades 34 are integrally connected to each other by a central hub 38 and the radially outer ends are integral with the rotor ring part 36a which thus externally surrounds the blades 34. As can be seen in FIG. 3, the stator ring part 36b of the electric motor 36 is arranged radially outside the rotor ring part 36a of the electric motor 36. The stator ring part 36b of the electric motor 36 carries windings for electromagnetically coupling with the armature carried by the rotor ring part 36a.

Also, it is observed that this stator annular part 36b of the electric motor 36 is surrounded externally by an annular part 40 of the fairing 41 of the thruster 30. To operate the electric motor 36, according to the invention, the circuits 42 of the power electronics are arranged in the annular part 40 of the fairing 41 of the thruster 30 and are distributed in an annular manner which allows for a reduction in space requirements. Moreover, this positioning ensures that the power circuits 42 are cooled since they are located close to the outside air circulation. The power circuits 42 are connected to a capacitor 44 which is also annularly shaped in the annular part 40 of the fairing 41 of the thruster 30. A voltage source 45 is connected to the capacitor 44. The voltage source, capacitor and power circuits form means 43 for supplying power to the electric motor.

To further improve cooling, an annular space 46 is formed between the annular part 40 of the fairing 41 and the stator annular part 36b of the electric motor 36, said annular space 46 opening at one end 47 along the axis A of the propeller 32 and upstream thereof with respect to the air flow. In this way, the suction effect created by the propeller 32 induces a circulation of air in the annular space 46, which makes it possible to ventilate the radially inner face of the annular part 40 of the fairing 41 and thus to cool the circuits 42 of the power electronics even better. It is observed that the cables 48 for electrical connection to the windings pass through the annular space 46.

In order to provide rotational guidance of the rotor ring part 36a of the electric motor 36 to the stator ring part 36b of the electric motor 36, rolling bearings 50 can be mounted between said rotor ring part 36a and stator ring part 36b.

Figure 4:
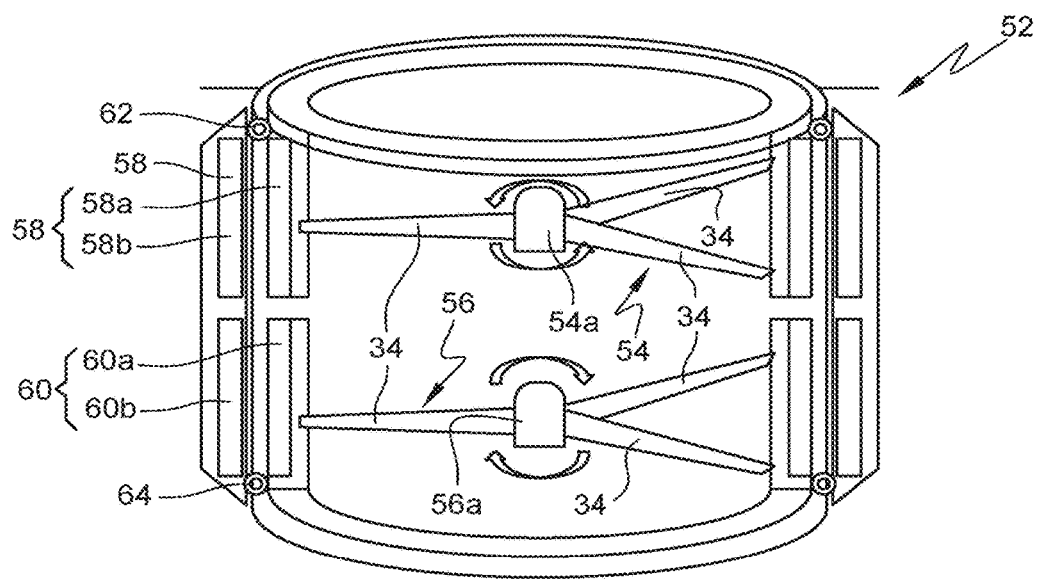
FIG. 4 represents an aircraft thruster including two propellers, in embodiments.

FIG. 4 shows another embodiment of the invention in which the thruster 52 no longer comprises a single propeller, but a first propeller 54 and a second propeller 56, the two propellers 54, 56 being configured to rotate in opposite directions, thereby reducing the nominal rotational speed of each propeller 54, 56. Each propeller is driven by its own electric motor, which can have the same configuration as described in FIG. 3. It is observed that the stator ring part 58b of the first electric motor 58 and the stator ring part 60b of the second electric motor 60 are fixed to each other and at least one first rolling bearing 62 ensures the rotational guidance of the rotor ring part 58a in a first direction of rotation direction of rotation relative to the first stator ring part 58b of the first electric motor 58 and at least one second rolling bearing 64 guides the second rotor ring part 60a in a second direction of rotation relative to the second stator ring part 60b of the second electric motor 60. In FIG. 4, the annular part of the fairing is not shown but can, as shown in FIG. 3, surround the first stator annular part 58b of the first electric motor 58 and the second stator annular part 60b of the second electric motor 60 and an annular space can be defined therein.

Figure 5:
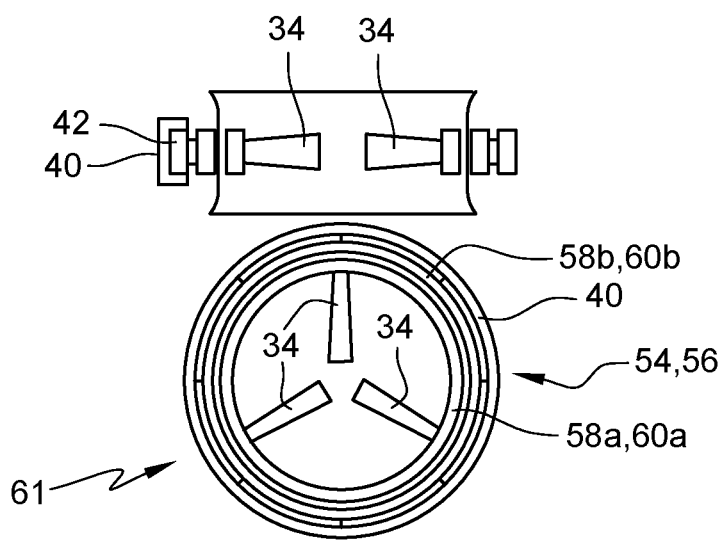
FIG. 5 represents an aircraft thruster without a central hub, in embodiments.

In FIG. 4, each propeller 54, 56 of the thruster 52 is connected to its own central hub 54a, 56a. Obviously, each propeller 54, 56 could be without a central hub as shown in the embodiment of FIG. 5. This could also be the case for the realization of FIG. 3.

Figure 6:
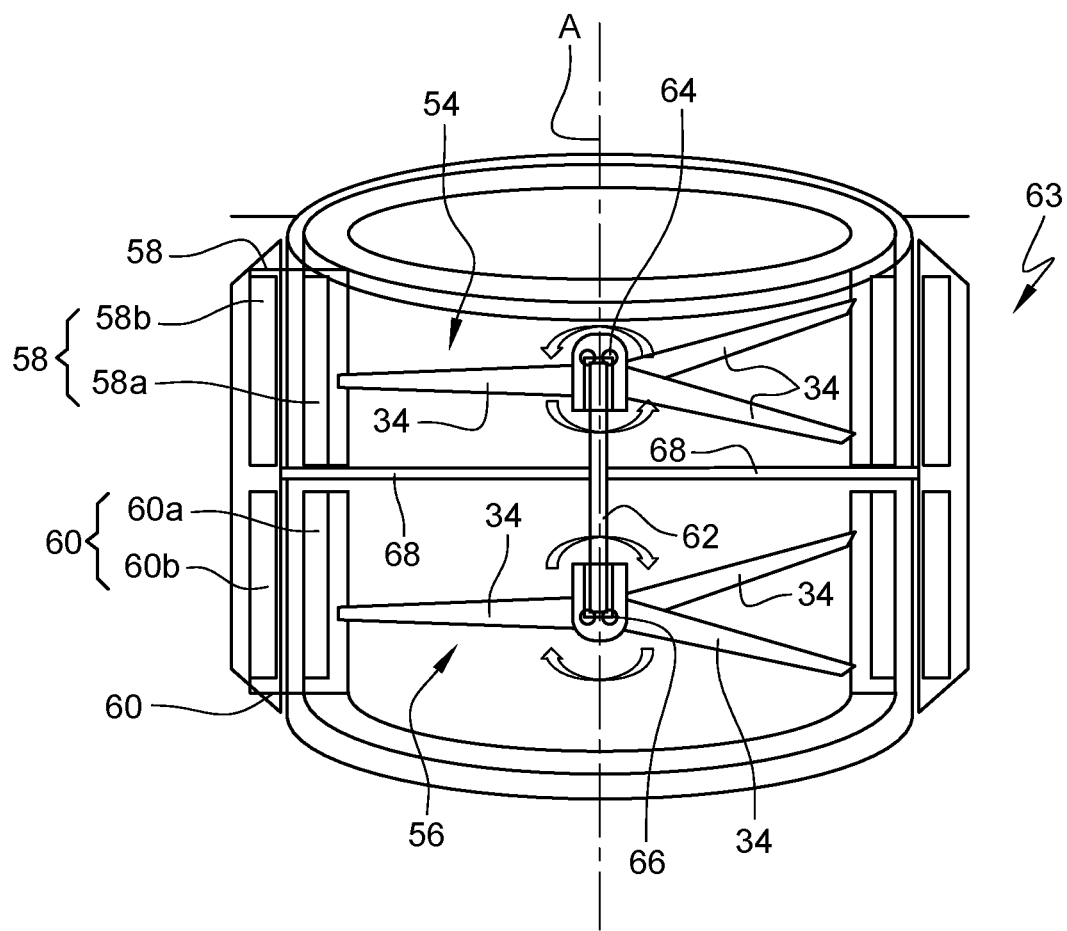
FIG. 6 represents an aircraft thruster, in embodiments.

FIG. 6 shows yet another embodiment of a thruster 63 of the invention which is similar to that described with reference to FIG. 4. The annular space and the annular part of the fairing are not shown. In this embodiment, a stationary central hub 62 provides rotational guidance for the first propeller 54 and the second propeller 56 via roller bearings 64, 66. This central hub 62, which extends along the axis A of the thruster 63, is connected to radial arms 68 for connection to the stator ring parts 58b, 60b of the first 58 and second 60 electric motors. These arms 68 are arranged axially between the first propeller 54 and the second propeller 56 and are shaped so as to provide force recovery while avoiding maximum impact on the air flow from the first propeller 54 to the second propeller 56.

Figure 7:
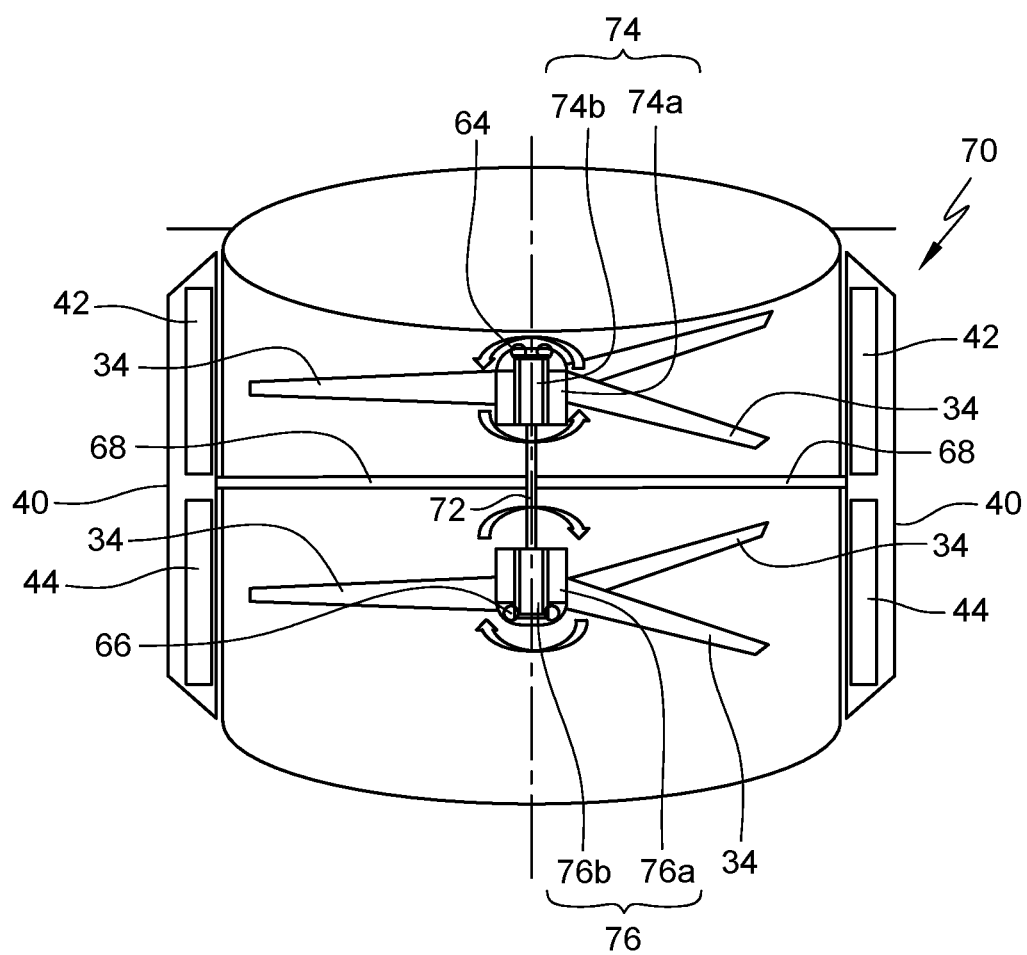
FIG. 7 represents an aircraft thruster, in embodiments.

Lastly, FIG. 7 shows a last embodiment of a thruster 70 with two counter-rotating propellers 54, 56, in which the power circuits 42 are obviously mounted in the annular part 40 of the fairing. This part 40 is connected by radial arms 68 to a central hub 72 which is surrounded at an upstream end by a stator part 74b of the first electric motor 74 and at a downstream end by a stator part 76b of the second electric motor 76. Each of the stator parts 74b, 76b of the electric motors 74, 76 is surrounded by an annular rotor part 74a, 76a of the first 74 and second 76 electric motors which is integral with the radially inner ends of the blades 34. At least one rolling bearing 64, 66 is interposed between each stator part 58b, 60b and an annular rotor part 58a, 60a of an electric motor 58, 60.

The invention claimed is:

1. An aircraft thruster (30) comprising:
a first propeller (32) provided with a plurality of radial blades (34) extending about an axis of rotation of the first propeller (32), which is driven in rotation by a first electric motor (36), power supply means of the first electric motor (36) comprise power circuits (42) carried by a fairing of the thruster,
wherein the power circuits (42) are arranged in an annular part (40) integral with the fairing of the thruster (30), the annular part (40) being arranged around said first propeller (32), the power circuits (42) positioned at a radially inner face of the annular part (40), wherein the annular part (40) integral with the fairing is radially outside a stator annular part (36*b*) of the first electric motor (36), wherein the radially inner face of the annular part (40) integral with the fairing and a radially outer face of the stator annular part (36*b*) of the first electric motor (36) delimit an annular space (46), one end of the annular space opens out along the axis of the first propeller (32) and towards an upstream side of the first propeller (32) with respect to an air flow.

2. An aircraft thruster according to claim 1, wherein the first electric motor (36) comprises an annular rotor part (36*a*) surrounding and integral with radially outer ends of the blades (34).

3. An aircraft thruster according to claim 1, wherein said at least one first propeller is guided in rotation by a central hub.

4. An aircraft thruster according to claim 2, wherein at least one first propeller (54, 56) lacks a central hub connected to radially inner ends of the blades (34).

5. An aircraft thruster according to claim 2, wherein the power supply means comprises a voltage source connected in parallel to a capacitor (44) annularly shaped within the annular part (40) of the fairing.

6. An aircraft thruster according to claim 2, wherein the thruster comprises a second propeller (56) counter-rotating relative to the first propeller (54), this second propeller (56) being arranged downstream of said first propeller (54) and being driven in rotation by a second electric motor.

7. An aircraft thruster according to claim 1, wherein said at least one first propeller is guided in rotation by a central hub.

8. An aircraft thruster according to claim 7, wherein the central hub is integral with the annular part that is integral with the fairing.

9. An aircraft thruster according to claim 1, wherein at least one first propeller (54, 56) lacks a central hub connected to radially inner ends of the blades (34).

10. An aircraft thruster according to claim 9, wherein the power supply means comprises a voltage source connected in parallel to a capacitor (44) annularly shaped within the annular part (40) of the fairing.

11. An aircraft thruster according to claim 1, wherein the power supply means comprises a voltage source connected in parallel to a capacitor (44) annularly shaped within the annular part (40) of the fairing.

12. An aircraft thruster according to claim 1, wherein the thruster comprises a second propeller (56) counter-rotating relative to the first propeller (54), this second propeller (56) being arranged downstream of said first propeller (54) and being driven in rotation by a second electric motor.

* * * * *